US009584671B2

(12) United States Patent
Gandhi et al.

(10) Patent No.: US 9,584,671 B2
(45) Date of Patent: Feb. 28, 2017

(54) TECHNIQUES TO TRANSFORM NETWORK RESOURCE REQUESTS TO ZERO RATED NETWORK REQUESTS

(71) Applicant: Facebook, Inc., Menlo Park, CA (US)

(72) Inventors: Shaheen A Gandhi, San Francisco, CA (US); Luiz Fernando Scheidegger, Redwood City, CA (US); Breno Pompeu Roberto, Santa Clara, CA (US); Peter Avelino Ruibal, San Mateo, CA (US); Marcus Erwin Schwartz, Oakland, CA (US)

(73) Assignee: FACEBOOK, INC., Menlo Park, CA (US)

( * ) Notice: Subject to any disclaimer, the term of this patent is extended or adjusted under 35 U.S.C. 154(b) by 108 days.

(21) Appl. No.: 14/548,043

(22) Filed: Nov. 19, 2014

(65) Prior Publication Data
US 2016/0142553 A1 May 19, 2016

(51) Int. Cl.
*H04M 15/00* (2006.01)
*H04W 12/08* (2009.01)
*H04W 4/24* (2009.01)

(52) U.S. Cl.
CPC .......... *H04M 15/39* (2013.01); *H04W 4/24* (2013.01)

(58) Field of Classification Search
CPC .......... H04L 12/1485; H04L 12/1496; H04L 12/1435; H04M 2215/74; G06F 15/173
USPC .......................... 455/406; 709/224
See application file for complete search history.

(56) References Cited

U.S. PATENT DOCUMENTS

| 7,058,633 B1 | 6/2006 | Gnagy et al. | |
| 7,701,870 B2* | 4/2010 | Bhatia | H04L 12/14 370/252 |
| 8,769,063 B2* | 7/2014 | Barton | H04L 41/00 709/220 |

(Continued)

OTHER PUBLICATIONS

International Search Report and Written Opinion received for PCT Patent Application No. PCT/US2014/066697, mailed Aug. 19, 2015, 12 pages.

(Continued)

*Primary Examiner* — William Nealon

(57) ABSTRACT

Techniques to transform network resource requests to zero rated network requests are described. Some embodiments are particularly directed to techniques transform network resource requests on a cellular network to zero rating by replacing the destination of the request with a zero-rated source for the network resource. In one embodiment, for example, an apparatus may comprise a data store and a network access component. The data store may be operative to store a plurality of zero-rating rewrite rules. The network access component may be operative to receive a network request from an application component on the mobile device, the network request for access to a network resource; compare the network resource to the plurality of zero-rating rewrite rules to identify a zero-rating rewrite rule matching the network resource; transform the network request to a zero-rated network request for the network resource using the identified zero-rating rewrite rule; and perform the zero-rated network request. Other embodiments are described and claimed.

20 Claims, 11 Drawing Sheets

(56) References Cited

U.S. PATENT DOCUMENTS

| | | | |
|---|---|---|---|
| 2003/0152039 A1* | 8/2003 | Roberts | G06Q 20/123 370/255 |
| 2007/0189300 A1* | 8/2007 | Bellora | H04L 12/14 370/395.2 |
| 2008/0014904 A1* | 1/2008 | Crimi | G06Q 30/04 455/406 |
| 2009/0168660 A1* | 7/2009 | Bhatia | H04L 12/14 370/252 |
| 2012/0151010 A1 | 6/2012 | Tsai | |
| 2012/0209990 A1* | 8/2012 | Honore | H04L 12/1496 709/224 |
| 2014/0040975 A1 | 2/2014 | Raleigh et al. | |

OTHER PUBLICATIONS

Extended European Search Report received for European Patent Application No. 151682192, mailed Apr. 20, 2016, 7 pages.

* cited by examiner

710

Receive a network request from an application component, the network request for access to a network resource hosted on a network server.
712

Match a domain name for the network resource against a plurality of domain name tags for a plurality of zero-rating rewrite rules using a processor circuit to identify a zero-rating rewrite rule associated with a domain name tag of the plurality of domain name tags matching the domain name.
714

Rewrite the domain name for the network request to a zero-rated domain name corresponding to a zero-rated network server using the identified zero-rating rewrite rule.
716

Request the network resource from the zero-rated network server using a network interface component.
718

Receive a network request from an application component, the network request for access to a network resource.
722

Retrieve a plurality of zero-rating rewrite rules from a data store, each of the plurality of zero-rating rewrite rules associated with a domain name pattern of a plurality of a domain name patterns.
722

Compare, using a processor circuit, a domain name for the network resource to one or more of the plurality of domain name patterns to identify a zero-rating rewrite rule of the plurality of zero-rating rewrite rules matching the domain name for the network resource.
726

Transform the network request to a zero-rated network request for the network resource using the identified zero-rating rewrite rule, the zero-rated network request comprising a zero-rated domain name replacing the domain name for the network request.
728

Perform the zero-rated network request using a network interface component.
730

*FIG. 7C*

TECHNIQUES TO TRANSFORM NETWORK RESOURCE REQUESTS TO ZERO RATED NETWORK REQUESTS

BACKGROUND

Cellular carriers may provide cellular data communication to their cellular customers. For example, smart phones and other mobile devices may run web browsers that may be used while on the cellular network to retrieve web pages. Additionally, many applications that may be pre-installed or user-installed on a mobile device may use cellular data communication to access remote data, such as resources available on the Internet. Some of these applications may use web requests—requests conforming to the hypertext transport protocol (HTTP) or related protocols, such as the hypertext transport protocol secure (HTTPS)—for their data access, even for data access distinct from conventional web access. For example, a social networking application may present a customized smart phone interface for use of a social network and use HTTP or HTTPS requests to retrieve the data presented on the customized smart phone interface.

Cellular carriers may not provide any or unlimited free cellular data communication to their cellular customers. Instead, cellular customers may be charged for bandwidth that they use on the carrier's cellular network. However, some cellular access may be "zero rated." Zero-rated cellular access may not contribute to capped free cellular data communication that may be included in a cellular customer's plan or pre-paid purchase. Zero-rated cellular access may not generate a fee to the cellular customer, even if that customer is over a limited quantity of allocated or pre-paid cellular data access, or where such an allocated or pre-paid cellular data access does not exist. Zero-rated cellular access may be dependent on the specific network accessed, with the cellular carrier having a list of one or more network addresses—such as internet protocol (IP) addresses—to which cellular customers have zero-rated access. This list may vary between cellular carriers.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to transform network resource requests to zero rated network requests. Some embodiments are particularly directed to techniques transform network resource requests on a cellular network to zero rating by replacing the destination of the request with a zero-rated source for the network resource. In one embodiment, for example, an apparatus may comprise a data store and a network access component. The data store may be operative to store a plurality of zero-rating rewrite rules. The network access component may be operative to receive a network request from an application component on the mobile device, the network request for access to a network resource; compare the network resource to the plurality of zero-rating rewrite rules to identify a zero-rating rewrite rule matching the network resource; transform the network request to a zero-rated network request for the network resource using the identified zero-rating rewrite rule; and perform the zero-rated network request. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 7B illustrates an embodiment of a third logic flow for the zero-rating transformation system of FIG. 1.

FIG. 7C illustrates an embodiment of a fourth logic flow for the zero-rating transformation system of FIG. 1.

DETAILED DESCRIPTION

Figure 1:
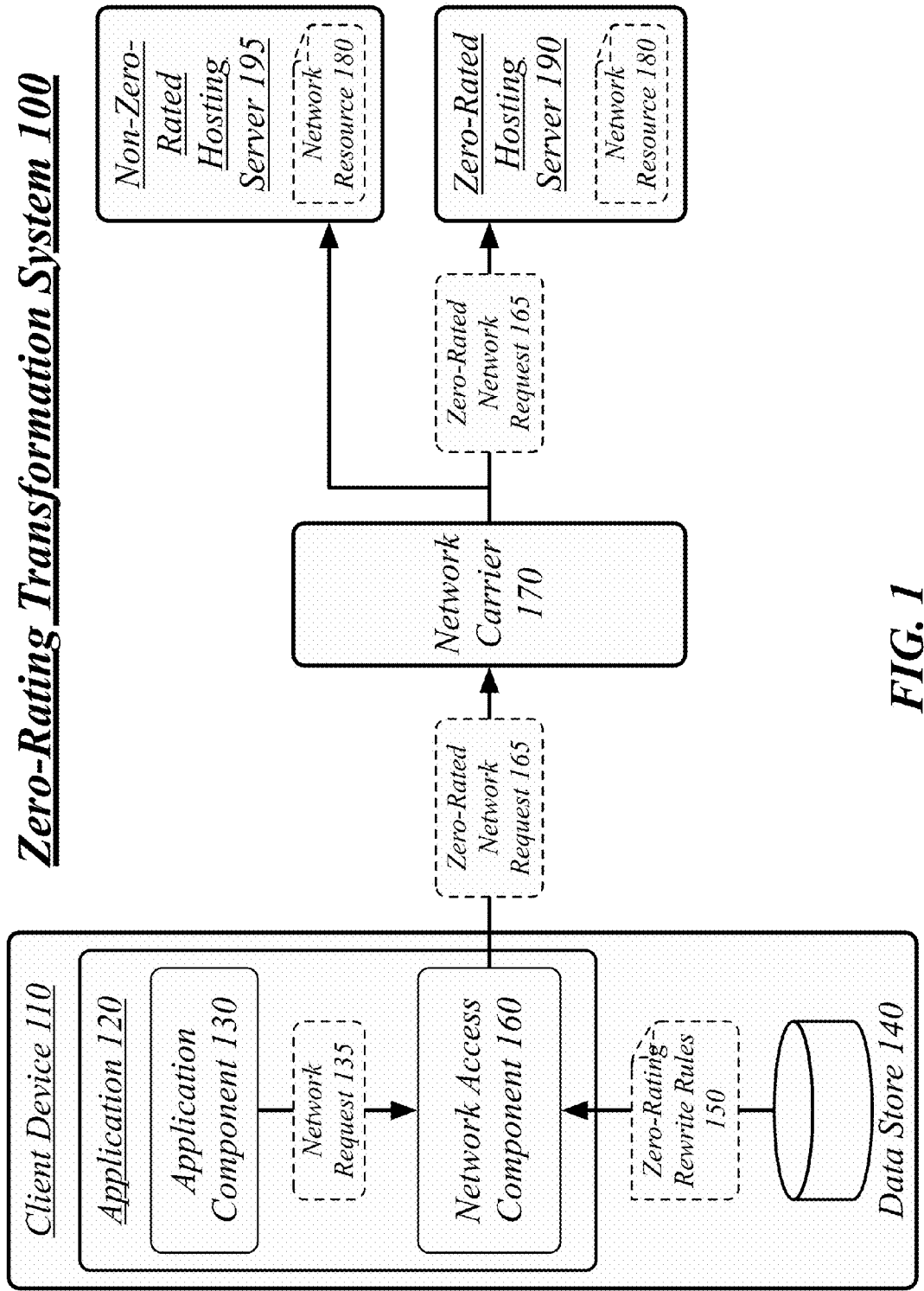
FIG. 1 illustrates an embodiment of a zero-rating transformation system.

Various embodiments are directed to techniques for a network access component operative to receive network requests for a network resource and transform the network requests to a zero-rated network requests for the same network resource. The network access component may manage network access for an application on a smart phone so as to minimize the cost of using cellular data access with the application. For instance, the application may correspond to an application for an Internet-based service, such as a social networking service. The Internet-based service may maintain a subset of servers which it has zero-rated with one or more cellular carriers; for example, the Internet-based service may zero-rate servers which are geographically proximate to, potentially even co-located with, a cellular carrier. However, the cellular data access of the application may be to a web front end for the Internet-based service, with this web front end not configured to return links to zero-rated resources for users that would benefit from such. Further, for the web front end for the Internet-based service to be configured to return links to zero-rated resources, the web front end would need to know for each user which resources would be zero-rated for that particular user, as that may vary between users based on their respective cellular carriers.

Instead, the application may be equipped to automatically transform uniform resource locators (URLs) to resources received from the Internet-based service to be retrieved from sources (e.g., servers) that are zero-rated with there particular cellular carrier. The application may download a list of rules, where each rule has a pattern against which it will match. Where a rule matches a URL, the rule may specify a transformation to generate a new URL from the received URL where the new URL resolves to a zero-rated server. This list of rules may be curated specifically for the cellular carrier of the user, with the specific list of rules provided to the user selected as corresponding to the user's cellular carrier. The application may therefore attempt to minimize the quantity of cellular data charges generated for the user by the application's cellular data access. As a result, the embodiments can improve the affordability of using an application and thereby increase the use of the application by users.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a zero-rating transformation system 100. In one embodiment, the zero-rating transformation system 100 may comprise a computer-implemented system having an application 120 comprising one or more components. The application 120 may comprise a software application wherein its component comprise software modules running on a client device 110 and using a data store 140 of the client device 110. Although the zero-rating transformation system 100 shown in FIG. 1 has a limited number of elements in a certain topology, it may be appreciated that the zero-rating transformation system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-$a$ may include components 122-1, 122-2, 122-3, 122-4 and 122-5. The embodiments are not limited in this context.

The zero-rating transformation system 100 may comprise the application 120. The application 120 may be generally arranged to perform cellular data access on behalf of a user. The application 120 may be generally arranged to structure cellular data access to use zero-rated resources whenever it possesses sufficient knowledge to do so. The application 120 may comprise an application component 130 and a network access component 160. It will be appreciate that the application 120 may not be limited to these components.

The client device 110 may comprise a mobile device served by a cellular carrier. The cellular carrier for client device 110 may be network carrier 170. It will be appreciated that network carriers other than cellular carriers may be used with relation to the described embodiments.

The application 120 may comprise an application component 130. The application component 130 may be generally arranged to perform user-facing tasks for the application 120. For instance, where the application 120 is an application for an Internet-based service, the application component 130 may display network resources for the user. The application component 130 may initiate the retrieval of network resources for display for the user using the network access component 160. The application component 130 may submit a network request 135 to the network access component 160, the network request 135 a request for access to a network resource 180.

The client device 110 may comprise a data store 140. The data store 140 may store a plurality of zero-rating rewrite rules 150. The data store 140 may comprise any known technique or technology for storing data on a client device 110.

The network resource 180 may comprise an Internet-accessible resource that may be provided by one or more Internet-accessible servers, such as non-zero rated hosting server 195 and zero-rated hosting server 190. Non-zero-rated hosting server 195 may comprise a source for network resource 180 that is not zero-rated by network carrier 170 for client device 110. Zero-rated hosting server 190 may comprise a source for network resource 180 that is zero-rated by network carrier 170 for client device 110. Application component 130 may be agnostic as to whether network resource 180 is retrieved from non-zero-rated hosting server 195 or zero-rated hosting server 190 so long as network resource 180 is retrieved in response to network request 135. Network resource 180 may be hosted by a plurality of servers, with both non-zero-rated hosting server 195 and zero-rated hosting server 190 among that plurality.

The application 120 may comprise a network access component 160. The network access component 160 may be generally arranged to receive a network request 135 from an application component 130 on the client device 110, the network request 135 for access to a network resource 180; compare the network resource 180 to the plurality of zero-rating rewrite rules 150 to identify a zero-rating rewrite rule matching the network resource 180; transform the network request 135 to a zero-rated network request 165 for the network resource 180 using the identified zero-rating rewrite rule; and perform the zero-rated network request 165. While not all network requests will prompt a response from the server to which they are requested, where the zero-rated hosting server 190 returns a response to the zero-rated network request 165 the network access component 160 may be operative to receive the response and pass it to the application component 130. In some cases, a zero-rated source for a network resource 180 may not be known to the network access component 160—the plurality of zero-rating rewrite rules 150 may not include a rule encompassing the network resource 180—in which case the network access component 160 may request the network resource 180 from a non-zero-rated hosting server 195.

In some cases the network resource 180 may comprise a web resource. The network resource 180 may comprise a web page. The network resource 180 may comprise a hypertext markup language (HTML) file, extensible markup language (XML), extensible hypertext markup language (XHTML) file, or any other file for composing the body of a web page. The network resource 180 may comprise an image file such as a joint photographic experts group (JPEG) file, graphic interchange format (GIF) file, portable network graphics (PNG) file, or any other type of image file. The network resource 180 may generally comprise any sort of web resource. For example, an application component 180 may load a web page and request a plurality of network resources including the HTML file making up the body of the page, a cascading style sheets (CSS) file describing the look and formatting of the page, and a plurality of media files includes images file. The network access component 160 may receive a request for each of those resources, apply the plurality of zero-rating rewrite rules 150 to each to transform them to zero-rated sources for those resources, and request the zero-rated resources.

The network access component 160 may be generally operative to receive, transform, and request any network resources that may be referenced by a URL or other technique for specifying locations for network-accessible resources. As such, where the network resource 180 comprises a web resource, the network request 135 comprising a request to retrieve the web resource from a non-zero rated URL, the network access component 160 may be operative to transforming the non-zero-rated URL to a zero-rated URL for the web resource using a zero-rating rewrite rule identified as matching the non-zero-rated URL for the web resource.

The network resource 180 may be hosted on a network server, such as non-zero-rated hosting server 195. The network resource 180 may also be hosted on a zero-rated network server, such as zero-rated hosting server 190. Comparing the network resource 180 to the plurality of zero-rating rewrite rules 150 may consist of matching a domain name for the network resource 180 against a plurality of domain name tags for the plurality of zero-rating rewrite rules 150 to identify the zero-rating rewrite rule associated with a domain name tag of the plurality of domain name tags matching the domain name. The domain name for the network resource 180 may be part of a URL for the network resource 180. A domain name tag may comprise a domain name pattern against which a domain name may be matched. The domain name tag may contain wildcard characters or other signifiers that indicate that multiple domain names may match against the tag. For example, a domain name tag "*.facebook.com" might match against any domain name ending with "facebook.com".

Transforming the network request 135 to the zero-rated network request 165 may comprise rewriting the domain name for the network request 135 to a zero-rated domain name corresponding to a zero-rated network server, such as zero-rated hosting server 190. The zero-rated network request 165 may comprise the zero-rated domain name replacing the domain name for the network resource 180 from the network request 135. Performing the zero-rated network request 165 therefore comprises requesting the network resource 180 from the zero-rated network server. The network resource 180 may be represented by a URL. Transforming the network request 135 to the zero-rated network request 165 may comprise replacing the domain name for the network request 135 in the URL with the zero-rated domain name according to the matching zero-rating rewrite rule.

The network access component 160 may be operative to retrieve the plurality of zero-rating rewrite rules 150 from a data store 140, each of the plurality of zero-rating rewrite rules 150 associated with a domain name pattern of a plurality of domain name patterns. A domain name pattern may comprise a standardized string, text field, or other data encoding representing one or more domain names. The domain name patterns may use wildcard characters to empower matching the domain name patterns against a plurality of different domain names. The network access component 160 may compare the domain name for the network resource 180 to one or more of the plurality of domain name patterns to identify the zero-rating rewrite rule of the plurality of zero-rating rewrite rules 150 matching the domain name for the network resource 180. The network access component 160 matching the zero-rating rewrite rule to the network resource 180 may correspond to the zero-rating rewrite rule identifying as matching the domain name for the network resource.

Zero rating transformation system 100 may include an authorization server (or other suitable component(s)) that allows users to opt in to or opt out of having their actions logged by zero rating transformation system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of application 120 and/or network carrier 170 through blocking, data hashing, anonymization, or other suitable techniques as appropriate.

Exchanging network traffic, such as performing zero-rated network request 165, may comprise transmitting and receiving network traffic via a network interface controller (NIC). A NIC comprises a hardware component connecting a computer device, such as client device 110, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API).

Figure 2:
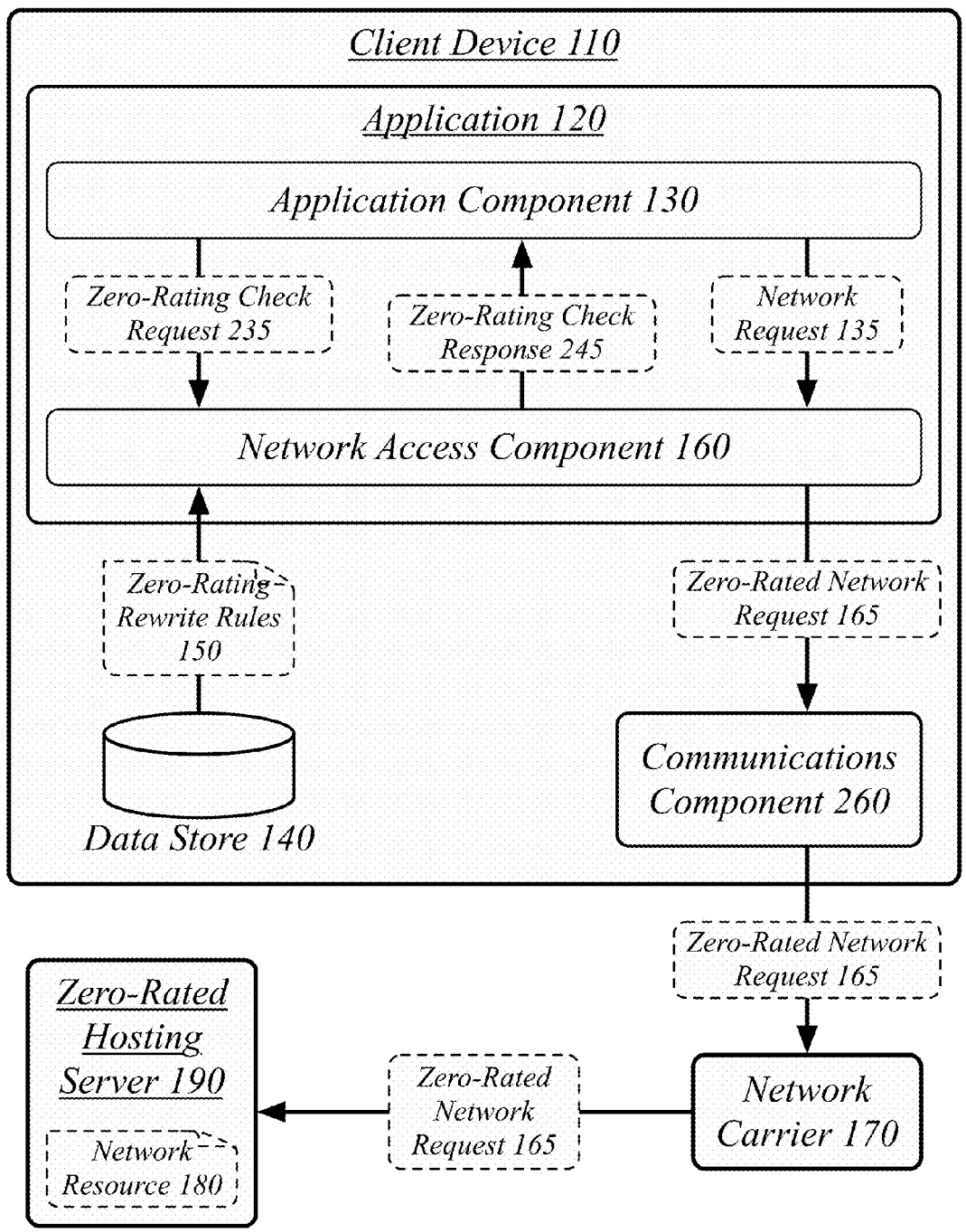
FIG. 2 illustrates an embodiment of a zero-rating transformation system in which a zero-rating check request is performed.

FIG. 2 illustrates a second block diagram for a zero-rating transformation system 100. In the illustrated embodiment of FIG. 2 a zero-rating check request 235 is made by the application component 130 to the network access component 160 prior to making the network request 135.

A zero-rating check request 235 is a request made to the network access component 160 to compare a network resource 180, such as a URL for the network resource 180, to the zero-rating rewrite rules 150 to determine whether the network resource 180 can be retrieved from a zero-rated source such as zero-rated hosting server 190. Each of the plurality of zero-rating rewrite rules 150 contain a pattern against which they will trigger. When used with a network request such as network request 135 this pattern is used to identify a particular rule so as to retrieve the associated transformation that may be used to convert the zero-rated network request 165 into the zero-rated network request 165, with the zero-rated network request 165 then automatically performed by the network access component 160. When used with a zero-rating check request 235 this pattern is used to determine whether the zero-rating check request 235 matches a particular rule such that the resource 180 identified by the zero-rating check request 235 may be transformed. The transformation itself is not performed on the network resource 180 of the zero-rating check request 235 nor is a request performed on the network carrier 170 in response to the zero-rating check request 235. As such, the application component 130 may use a zero-rating check request 235 to determine whether a particular network resource 180 may be requested from a zero-rated source.

The network access component 160 may transmit a zero-rating check response 245 to the application component 130. The zero-rating check response 245 may comprise an indication to the application component 130 of whether the network resource 180 referenced by the zero-rating check request 235 can be retrieved from a zero-rated source such as zero-rated hosting server 190. The zero-rating check response 245 may comprise an indication to the application component 130 of whether the zero-rating rewrite rules 150 contain a rule matching the network resource 180, such as a rule containing a pattern matching a provided URL for the network resource 180.

The application component 130 may be operative to perform a zero-rating check request 235 in response to a user request to the application 120 to make a network request 135. For instance, a user may select an icon, picture, or segment of text, follow a link, or otherwise select that a URL be loaded or otherwise accessed. The application component 130 may, in response to the user request, transmit zero-rating check request 235 to the network access component 160 to determine whether the user request may be performed without generating bandwidth costs for the user with the network carrier 170.

If the zero-rating check response 245 indicates that a network request 135 would be transformed to a zero-rated network request 165 if performed with the network access component 160, the application component 130 may automatically proceed to perform the network request 135 for the network resource 180 without consultation with the user of application 120. If the zero-rating check response 245 indicates that a network request 135 would not be transformed to a zero-rated network request 165—that the zero-rating rewrite rules 150 do not contain a rule to transform a network request 135 to a zero-rated network request 165—the application component 130 may inform the user that accessing network resource 180 may incur bandwidth charges with the network carrier 170. The application component 130 may display a dialog to the user of application 120 informing them of the possible bandwidth charges and asking whether they still want to access the network resource 180. If the user indicates through the dialog that they still want to access the network resource 180, the application component 130 may, in response, perform network request 135, with the network resource 180 retrieved from a non-zero rated hosting server 195, potentially incurring charges with network carrier 170.

As shown in FIG. 2, network requests—including zero-rated network request 165 and an untransformed network request 135—may be performed by the network access component 160 using a communications component 260 of the client device 110. The communications component 260 may comprise a software component of an operating system of the client device 110, may comprise one or more hardware component such as a cellular communications component, and may comprise a combination of such software and hardware components. For instance, the communications component 260 may be provided by the client device 110 and managed by an operating system and firmware of the client device 110. The communications component 260 may be accessible to the application 120 and its network access component 160 via the operating system of the client device 110 for use in performing cellular communication via network carrier 170.

The network access component 160 may perform transmission control protocol/internet protocol (TCP/IP) communication via a TCP/IP network application programming interface (API) of an operating system of the client device 110. The network access component 160 may perform user datagram protocol/IP (UDP/IP) communication via a UDP/IP network API of an operating system of the client device 110. The network access component 160 may generally perform communication via an API of the operating system of the client device 110, the OS transmitted the communication via the communications component 260.

The network carrier 170 will receive a request such as network request 135 or zero-rated network request 165 and compare the destination of the request to a list of zero-rated destinations to determine whether the request is zero-rated or should generate charges to the client. If a request received from a client device 110 is on the list of zero-rated destinations, which list may be denominated and indexed by IP address, the request will not generate specific bandwidth charges to the client. If the request received from the client device 110 is not on the list of zero-rated destinations, the network carrier 170 will charge the user's account—such as prospectively to a future monthly bill or reducing a balance of available bandwidth or prepaid amount—for the bandwidth used in transmitting the request and, if applicable, receiving a response.

Figure 3:
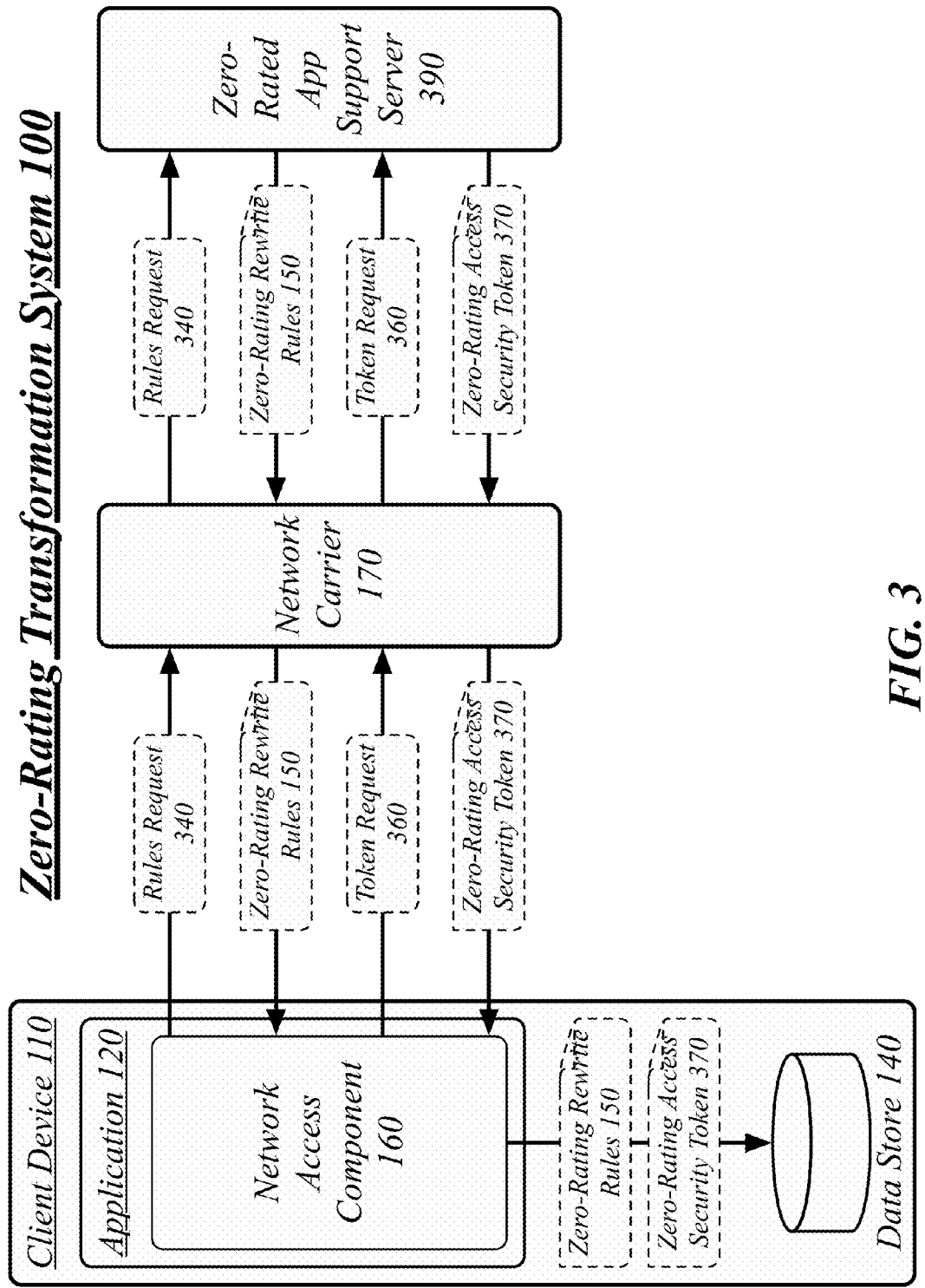
FIG. 3 illustrates an embodiment of a zero-rating transformation system in which zero-rating rewrite rules and a zero-rating access security token are downloaded.

FIG. 3 illustrates a third block diagram for a zero-rating transformation system 100. In the illustrated embodiment of FIG. 3 the plurality of zero-rating rewrite rules 150 and a zero-rating access security token 370 are downloaded by the network access component 160 from a zero-rated app support server 390.

The network access component 160 uses the zero-rating rewrite rules 150 to transform network requests to zero-rated network requests and to determine which network requests may be transformed into zero-rated network requests. However, to the extent that the zero-rating rewrite rules 150 accurately perform this task the zero-rating rewrite rules 150 must match the actual listing of zero-rated sources (e.g., network addresses) for the network carrier 170 of the client device 110. As such, the zero-rating rewrite rules 150, in order to function properly, must both be specific to the network carrier 170 for the client device 110 and be kept up-to-date. Therefore, the application 120 cannot simply ship with a set of zero-rating rewrite rules 150, such as being distributed through a mobile app distribution service with the zero-rating rewrite rules 150 already configured, and simply continue to use the same plurality of zero-rating rewrite rules 150 through its operation.

Instead, the application 120 may be operative to retrieve the zero-rating rewrite rules 150 from a zero-rated app support server 390. The zero-rated app support server 390 may provide zero-rating support functionality to client devices such as client device 110 in performing zero-rating transformations of network requests. The zero-rated app support server 390 may be particularly associated with a provider of application 120. For instance, if application 120 is an Internet-service specific application, such as an application specifically for using a social-networking service, the Internet service may provide one or more zero-rated app support servers for providing zero-rating rewrite rules to users of application 120. The zero-rated app support server 390 may maintain pluralities of zero-rating rewrite rules, wherein a specific plurality of zero-rating rewrite rules may be associated with each network carrier supported by the zero-rated app support server 390, with the zero-rating rewrite rules 150 associated with network carrier 170 comprising one such association.

As such, an application 120 may transmit a rules request 340 to the zero-rated app support server 390 and receive the zero-rating rewrite rules 150 in response to the rules request 340. The rules request 340 may contain information provided by the application 120 sufficient for the zero-rated app support server 390 to identify the network carrier 170 for the client device 110, so as to empower the zero-rated app support server 390 to identify the particular zero-rating rewrite rules 150 appropriate to the client device 110. Alternatively, the zero-rated app support server 390 may infer the network carrier 170 used by the client device 110 based on one or more aspects of the delivery of rules request 340 to the zero-rated app support server 390. For instance, the rules request 340 may be delivered via a gateway of the network carrier 170 that the zero-rated app support server 390 identifies in order to identify the network carrier 170. In general, the zero-rated app support server 390 may receive the rules request 340, determine the network carrier 170 associated with the client device 110, and transmit the zero-rating rewrite rules 150 in response to the network access component 160. Upon receiving the zero-rating rewrite rules 150 from the zero-rated app support server 390 the network access component 160 may store the zero-rating rewrite rules 150 in the data store 140 for future use.

The zero-rated app support server 390 may itself be zero-rated with the network carrier 170. In general, the provider and maintainer of the zero-rated app support server 390 may contract, certify, or otherwise arrange with the network carrier 170 to be zero-rated for its clients.

The zero-rated app support server 390 may be preconfigured with the network access component 160 for an initial retrieval of the plurality of zero-rating rewrite rules 150 during initialization of the network access component 160. The application 120 may on installation, first launch, or first authentication with an Internet-based service perform various initialization operations. One of these initialization operations may be to initialize the network access component 160 with the zero-rating rewrite rules 150. The network access component 160 may use an address—such as a URL, domain, or IP address—preconfigured with the network access component 160 to contact the zero-rated app support server 390 to perform the rules request 340 and receive the zero-rating rewrite rules 150 in response. This may correspond to a bootstrap process in which the zero-rated app support server 390 is initially the only zero-rated server known to the application 120, with the received zero-rating rewrite rules 150 empowering the application 120 to perform more general network tasks using zero-rated sources.

The application 120 may also periodically update itself with the most recent zero-rating rewrite rules 150 for its network carrier 170 using the zero-rated app support server 390. The application 120 may, on a predefined schedule, contact the zero-rated app support server 390 with a rules request 340, receive the zero-rating rewrite rules 150, and store the zero-rating rewrite rules 150 in the data store 140. This predefined schedule may comprise, for example, a twenty-four hour schedule. In some embodiments, the network access component 160 may only perform this update when the application 120 is being run by the user—such as being foregrounded by the user—with the network access component 160 performing the update based on a determination that at least a minimum amount of time defined by the predefined schedule has passed since the last retrieval of the zero-rating rewrite rules 150. In other embodiments the update may be performed even where the application 120 is backgrounded.

In some embodiments, the zero-rated hosting server 190 may only respond to, process, or otherwise allow zero-rated network requests, such as zero-rated network request 165, where such a request is accompanied by a zero-rating access security token 370. The zero-rated hosting server 190 being zero-rated may correspond to the provider of the zero-rated hosting server 190 making an agreement with the network carrier 170. In some cases, this agreement may incur fees for the provider of the zero-rated hosting server 190, such as covering the charges that would normally be applied to the user of client device 110 or some other form of bandwidth-based charge. As such, the provider of zero-rated hosting server 190 may be benefited by limiting access to the zero-rated hosting server 190. For instance, the provider of the zero-rated hosting server 190 may prefer to only allow access to the zero-rated hosting server 190 by users of an application 120 specific to an Internet-based service provided by the provider of the zero-rated hosting server 190, not allowing access to the zero-rated hosting server 190 to those who access the Internet-based service using, for example, a web front-end to the service.

In some embodiments, the network access component 160 may transmit token request 360 and receive the zero-rating access security token 370. In some cases, the zero-rating access security token 370 may only be received where the application 120 authenticates with the Internet-based service. The zero-rating access security token 370 may be uniquely associated with an account for the Internet-based service, such as by being a hash of a user identifier of the user of the client device 110 with the Internet-based service. In some embodiments, the token request 360 may be transmitted to and the zero-rating access security token 370 received from the zero-rated app support server 390, as the zero-rated app support server 390 is a zero-rated server known to the application 120 at the time of initialization of the application 120. In other embodiments, the token request 360 may be transmitted to and the zero-rating access security token 370 received from a different server, which may or may not be zero-rated, maintained by the provider of the Internet-based service. The network access component 160 may, upon receive the zero-rating access security token 370, store the zero-rating access security token 370 in the data store 140. The zero-rating access security token 370 may also be a general security token for the application 120 and be used for other interactions with the Internet-based service. In some cases only a portion of zero-rated network requests will use the zero-rating access security token 370, with other zero-rated network requests not requiring any proof of authentication to be performed. For example, a first portion of the zero-rating rewrite rules 150 may correspond to the provider of the Internet-based service maintaining the zero-rated app support server 390 and a second portion of the zero-rating rewrite rules 150 may correspond to other provider of Internet-based resources. The zero-rating access security token 370 might only be used with the first portion, with the second portion not requiring a security token for access, or using their own, distinct security token or other proof of authorization.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
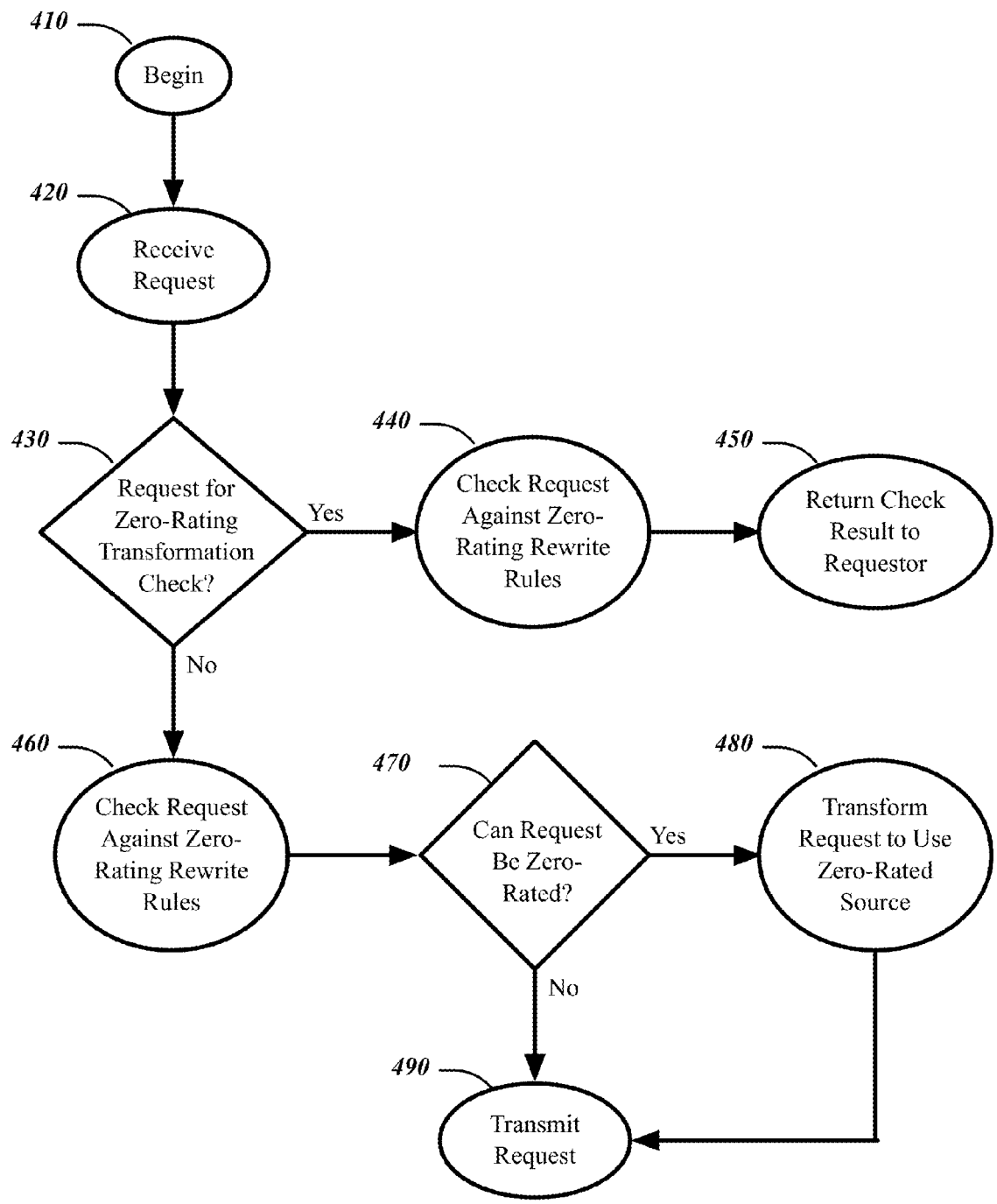
FIG. 4 illustrates an embodiment of a logic flow for the zero-rating transformation system of FIG. 1.

FIG. 4 illustrates one embodiment of a logic flow 400. The logic flow 400 may be representative of some or all of the operations executed by one or more embodiments described herein.

The logic flow 400 may begin at block 410. This may correspond to the initiation of the logic corresponding to the network access component 160, to the network access component 160 exiting a wait state, or any other operation putting the network access component 160 in position to receive and process a network request 130. The logic flow 400 may then proceed to block 420.

The logic flow 400 may receive a request at block 420. This may comprise an API being used to provide the request to a network access component 160. This may correspond to an application 120 entering into a portion of its logic responsible for the performance of requests such as network requests and zero-rating check requests. The logic flow 400 may then proceed to block 430.

The logic flow 400 may determine whether the request is for a zero-rating transformation check at block 430. If the request is a zero-rating transformation check, then the logic flow 400 may proceed to block 440. Otherwise, the logic flow 400 may proceed to block 460.

The logic flow 400 may check the request against the zero-rating rewrite rules 150 at block 440. The request may be compared to the zero-rating rewrite rules 150 to determine whether any of the rules match the request, such as by matching a domain or URL identifying the network resource 180 requested by the request. The logic flow 400 may then proceed to block 450.

The logic flow 400 may return the check result to the requestor at block 450. The requestor may correspond to another component, function, logical unit, thread, or other element of an application 120 executing the logic flow 400. The logic flow 400 may then terminate, such as an inherent part of returning the check result, until a new request is initiated.

The logic flow 400 may check the request against the zero-rating rewrite rules at block 460. The request may be compared to the zero-rating rewrite rules 150 to determine whether any of the rules match the request, such as by matching a domain or URL identifying the network resource 180 requested by the request. The logic flow 400 may then proceed to block 470.

The logic flow 400 may branch on whether the request can be zero-rated at block 470. If the request can be zero-rated by the zero-rating rewrite rules 150, then the logic flow 400 may proceed to block 480. Otherwise, the logic flow 400 may proceed to block 490.

The logic flow 400 may transform the request to use a zero-rated source at block 480. A network resource 180 may be provided by more than one source, with a subset of the sources being zero-rated with a network carrier 170. The zero-rating rewrite rules 150 may be used to transform the domain, URL, or other address component of the request to be a zero-rated source. The logic flow may then proceed to block 490.

The logic flow 400 may transmit the request at block 490. Transmitting the request may comprise using a communications component 260 of the client device 110 to transmit the request via cellular signals to a network carrier 170, which then transmits the request to a server over the Internet. This may be performed by engaging a network API of the client device 110. Where the request could be transformed by the zero-rating rewrite rules 150 to use a zero-rated source a zero-rated hosting server 190 may be the recipient of the request. Where the request could not be transformed by the zero-rating rewrite rules 150 to use a zero-rated source a non-zero-rated hosting server 195 may be the recipient of the request. The logic flow 400 may then terminate. The logic flow 400 may return an indication of successful transmission to another element of the logic flow the application 120. The logic flow 400 may return this indication as an inherent part of terminating.

The embodiments are not limited to this example.

Figure 5:
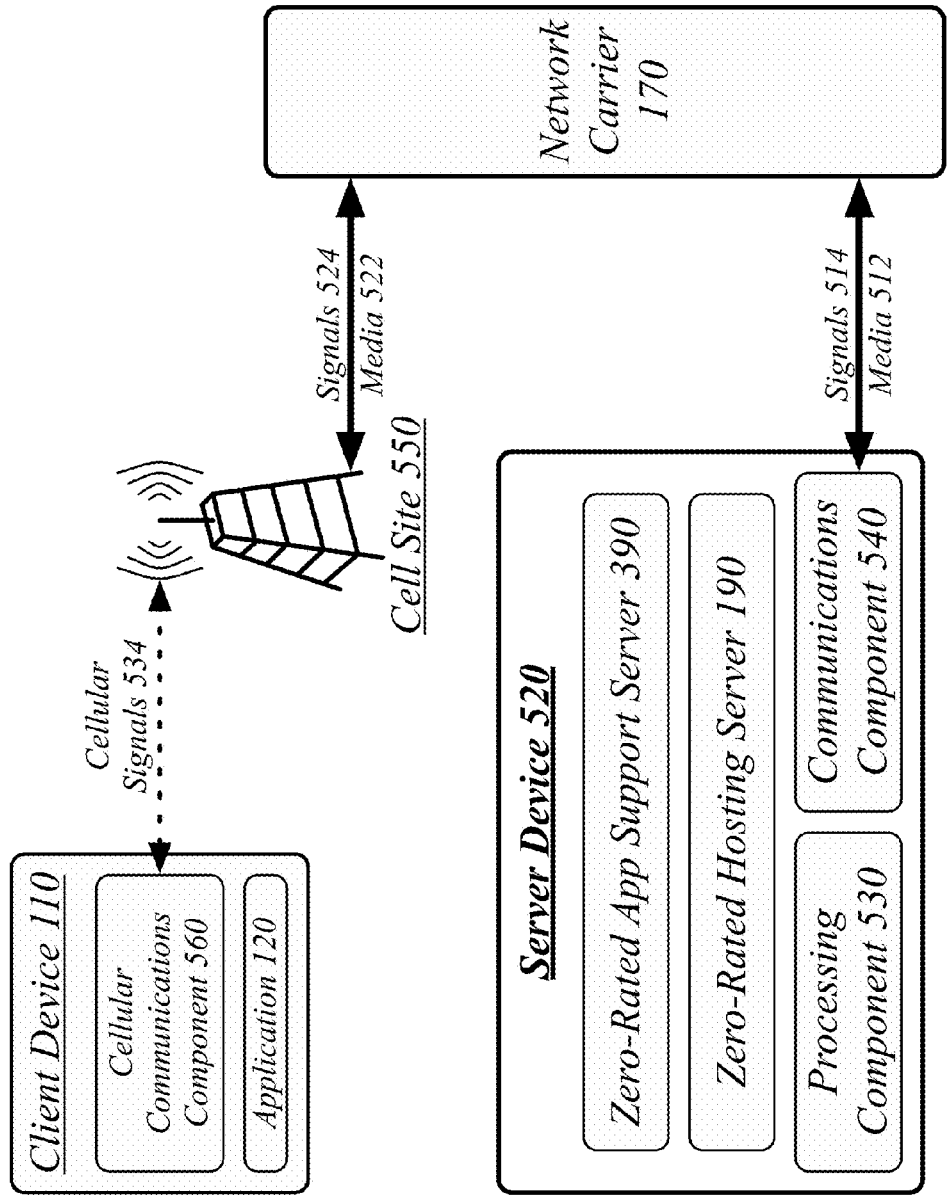
FIG. 5 illustrates an embodiment of a centralized system for the zero-rating transformation system of FIG. 1.

FIG. 5 illustrates a block diagram of a centralized system 500. The centralized system 500 may implement some or all of the structure and/or operations for the zero-rating transformation system 100 in a single computing entity, such as entirely within a single server device 520.

The server device 520 may comprise any electronic device capable of receiving, processing, and sending information for the zero-rating transformation system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The server device 520 may execute processing operations or logic for the zero-rating transformation system 100 using a processing component 530. The processing component 530 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The server device 520 may execute communications operations or logic for the zero-rating transformation system 100 using communications component 540. The communications component 540 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 540 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 512, 522 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The server device 520 may comprise the zero-rated app support server 390 and the zero-rated hosting server 190. The server device 520 may communicate with network carrier 170 using signals 514 sent over media 512. The server device 520 communicating with the network carrier 170 may comprise the zero-rated app support server 380 receiving the zero-rating rewrite rules 150 from the network carrier 170 for storage and eventual distribution to clients such as client device 110. The signals 512 sent over media 512 may also comprise communication between the client device 110 and the server device 520, such as for the performance of the operations of the zero-rated app support server 390 and the zero-rated hosting server 190 with respect to the client device 110.

The client device 110 may communicate with network carrier 170 using cellular signals 534 transmitted using cellular broadcast. The client device 110 may comprise cellular communications component 560 that uses cellular transmission to connect to cell site 550. It will be appreciated that the cell site 550 may be provided by the network carrier 170 and be part of its infrastructure. The cellular communications component 560 may correspond to the communication component 260 discussed with reference to FIG. 2. It will be appreciated that client device 110 may connect to a variety of cellular sites on various uses of application 120 as the client device 110 transitions between locations and therefore cellular sites. The signals 534 may be used by the client device 110 to communicate with the network carrier 170, the zero-rated app support server 390 and the zero-rated hosting server 190 hosted by server device 520, and with other servers, clients, and other computing devices accessible via the network carrier 170, such as servers, clients, and other computing devices accessible via the Internet.

Figure 6:
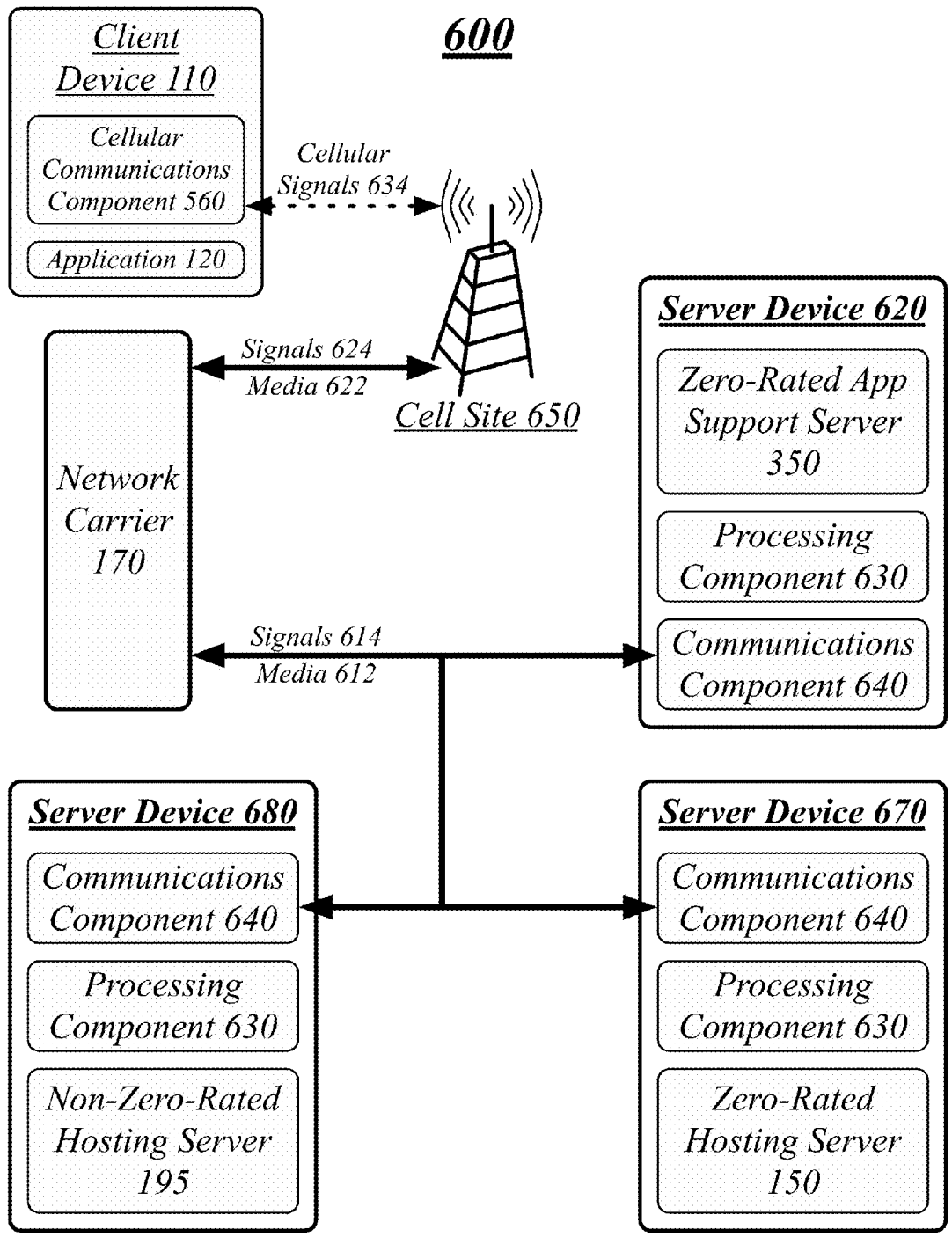
FIG. 6 illustrates an embodiment of a distributed system for the zero-rating transformation system of FIG. 1.

FIG. 6 illustrates a block diagram of a distributed system 600. The distributed system 600 may distribute portions of the structure and/or operations for the zero-rating transformation system 100 across multiple computing entities. Examples of distributed system 600 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 600 may comprise a client device 110 and server devices 620, 670, and 680. In general, the client device 110 and the server devices 620, 670, and 680 may be the same or similar to the server device 520 as described with reference to FIG. 5. For instance, the client device 110 and the server devices 620, 670, and 680 may each comprise a processing component 630 and a communications component 640 which are the same or similar to the processing component 530 and the communications component 540, respectively, as described with reference to FIG. 5. In another example, the devices 110, 620, 670, and 680 may communicate over a communications media 612 using communications signals 614 via the communications components 640. The client device 110 may be bridged to media 612 by cellular signals 634 broadcast to a cell site 650 and by signals 624 sent over media 622 to the network carrier 170. It will be appreciated that the cell site 650 may be provided by the network carrier 170 and be part of its infrastructure.

The server device 620 may comprise or employ one or more server programs that operate to perform various methodologies in accordance with the described embodiments. In one embodiment, for example, the server device 620 may implement the zero-rated app support server 350. As such, the communication between the server device 620 and the client device 110 may correspond to the client requesting and receiving the zero-rating rewrite rules 150 and zero-rating access security token 370.

The server device 670 may comprise or employ one or more server programs that operate to perform various methodologies in accordance with the described embodiments. In one embodiment, for example, the server device 670 may implement the zero-rated hosting server 150. As such, the communication between the server device 670 and the client device 110 may correspond to the client requesting and receiving the network resource 180 as a zero-rated communication.

The server device 680 may comprise or employ one or more server programs that operate to perform various methodologies in accordance with the described embodiments. In one embodiment, for example, the server device 680 may implement the non-zero-rated hosting server 195. As such, the communication between the server device 670 and the client device 110 may correspond to the client requesting and receiving the network resource 180 as a non-zero-rated communication.

Figure 7A:
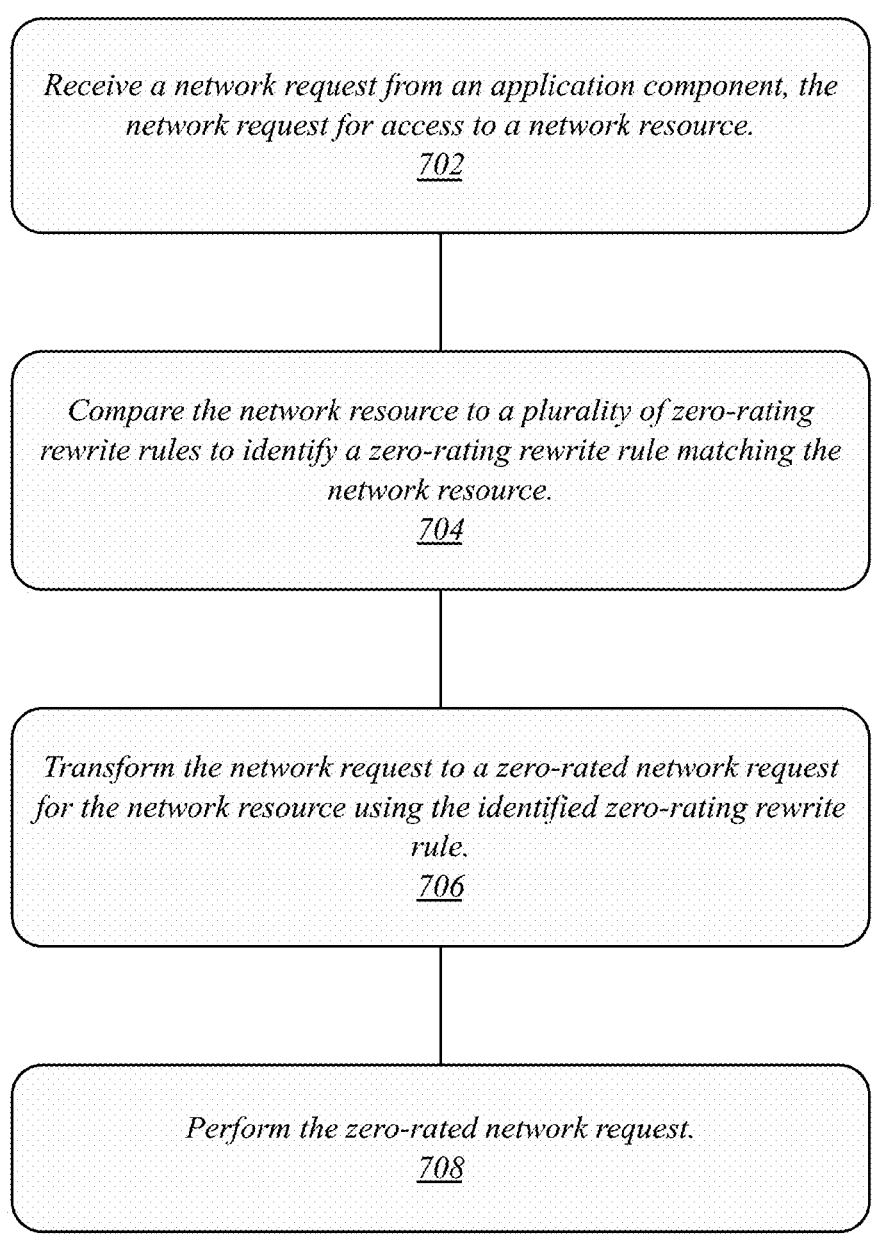
FIG. 7A illustrates an embodiment of a second logic flow for the zero-rating transformation system of FIG. 1.

FIG. 7A illustrates one embodiment of a logic flow 700. The logic flow 700 may be representative of some or all of the operations executed by one or more embodiments described herein.

In the illustrated embodiment shown in FIG. 7, the logic flow 700 may receive a network request 135 from an application component 130, the network request 135 for access to a network resource 180 at block 702.

The logic flow 700 may compare the network resource 180 to a plurality of zero-rating rewrite rules 150 to identify a zero-rating rewrite rule matching the network resource 180 at block 704.

The logic flow 700 may transform the network request 135 to a zero-rated network request 165 for the network resource 180 using the identified zero-rating rewrite rule at block 706.

The logic flow 700 may perform the zero-rated network request 165 at block 708.

FIG. 7B illustrates one embodiment of a logic flow 710. The logic flow 710 may be representative of some or all of the operations executed by one or more embodiments described herein.

In the illustrated embodiment shown in FIG. 7, the logic flow 710 may receiving a network request 135 from an application component 130, the network request 135 for access to a network resource 180 hosted on a network server at block 712.

The logic flow 710 may match a domain name for the network resource 180 against a plurality of domain name tags for a plurality of zero-rating rewrite rules 150 using a processor circuit to identify a zero-rating rewrite rule associated with a domain name tag of the plurality of domain name tags matching the domain name at block 714.

The logic flow 710 may rewrite the domain name for the network request 135 to a zero-rated domain name corresponding to a zero-rated network server using the identified zero-rating rewrite rule at block 716.

The logic flow 710 may request the network resource 180 from the zero-rated network server using a network interface component at block 718.

FIG. 7C illustrates one embodiment of a logic flow 720. The logic flow 720 may be representative of some or all of the operations executed by one or more embodiments described herein.

In the illustrated embodiment shown in FIG. 7, the logic flow 720 may receive a network request 135 from an application component 130, the network request 135 for access to a network resource 180 at block 722.

The logic flow 720 may retrieve a plurality of zero-rating rewrite rules 150 from a data store 140, each of the plurality of zero-rating rewrite rules 150 associated with a domain name pattern of a plurality of a domain name patterns at block 724.

The logic flow 720 may compare, using a processor circuit, a domain name for the network resource 180 to one or more of the plurality of domain name patterns to identify a zero-rating rewrite rule of the plurality of zero-rating rewrite rules 150 matching the domain name for the network resource 180 at block 726.

The logic flow 720 may transform the network request 135 to a zero-rated network request 165 for the network resource 180 using the identified zero-rating rewrite rule, the zero-rated network request 165 comprising a zero-rated domain name replacing the domain name for the network request 135 at block 728.

The logic flow 720 may perform the zero-rated network request 165 using a network interface component at block 730.

The embodiments are not limited to these examples.

Figure 8:
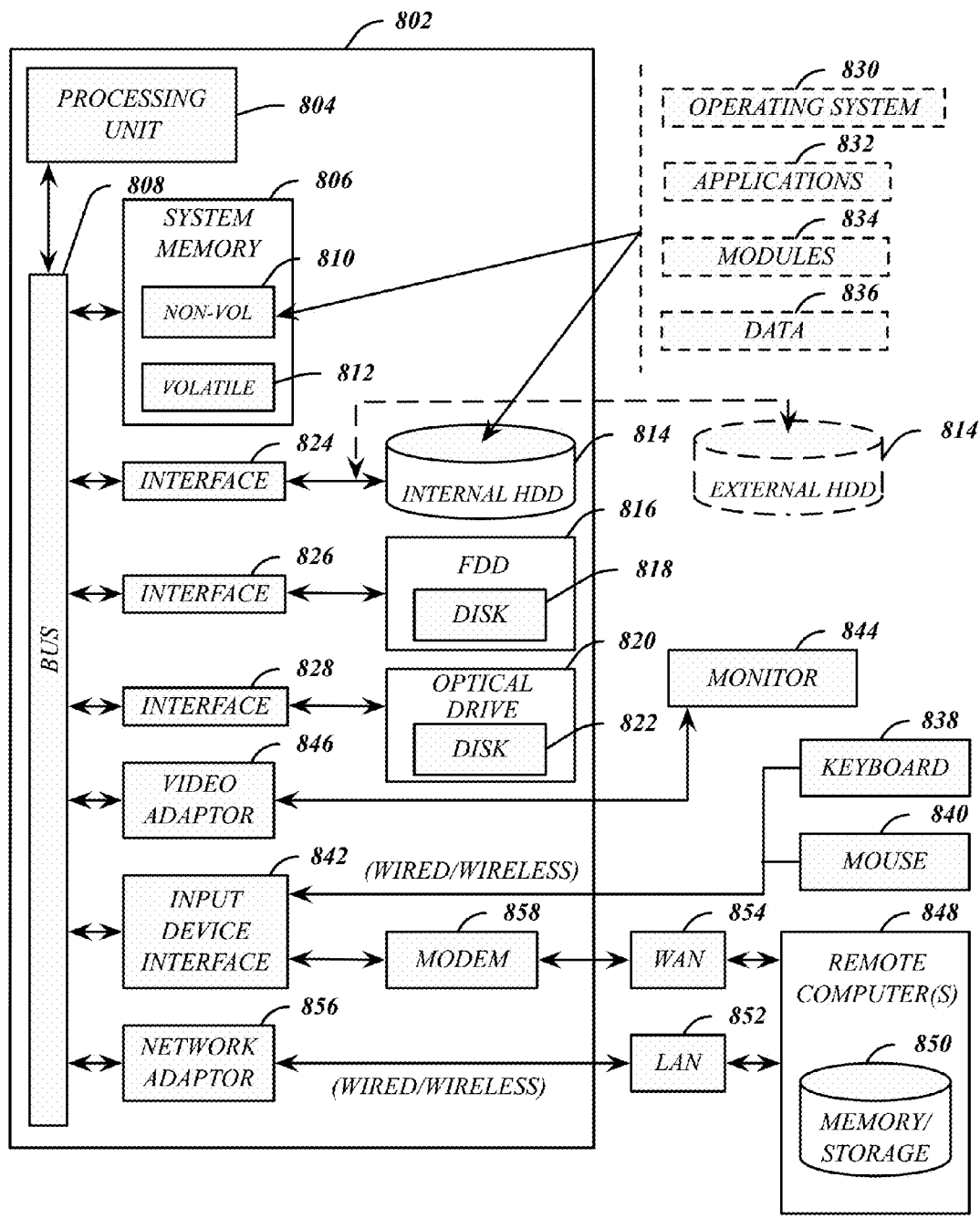
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the zero-rating transformation system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.8 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.8x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
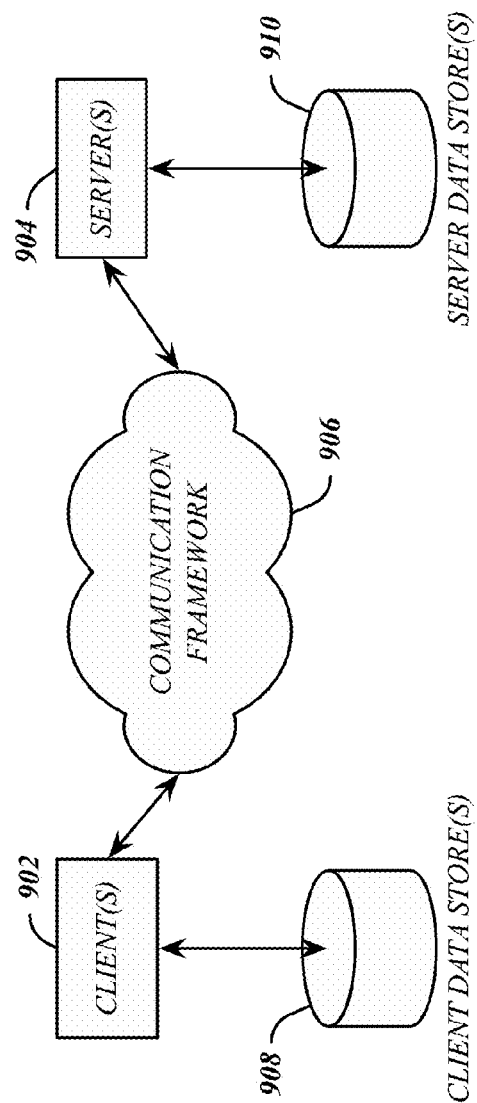
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement the client device 910. The servers 904 may implement the server device 950. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving a network request from an application component of a client device, the network request for access to a network resource;
comparing, using a processor circuit of the client device, the network resource to a plurality of zero-rating rewrite rules to identify a zero-rating rewrite rule matching the network resource;
transforming the network request to a zero-rated network request for the network resource using the identified zero-rating rewrite rule; and
performing the zero-rated network request using a network interface controller.

2. The method of claim 1, the network resource hosted on a network server, wherein comparing the network resource to the plurality of zero-rating rewrite rules comprises matching a domain name for the network resource against a plurality of domain name tags for the plurality of zero-rating rewrite rules to identify the zero-rating rewrite rule associated with a domain name tag of the plurality of domain name tags matching the domain name, wherein transforming the network request to the zero-rated network request for the network resource comprises rewriting the domain name for the network request to a zero-rated domain name corresponding to a zero-rated network server, wherein performing the zero-rated network request comprises requesting the network resource from the zero-rated network server.

3. The method of claim 1, the zero-rated network request comprising a zero-rated domain name replacing a domain name for the network resource from the network request, further comprising:
retrieving the plurality of zero-rating rewrite rules from a data store, each of the plurality of zero-rating rewrite rules associated with a domain name pattern of a plurality of a domain name patterns;
comparing the domain name for the network resource to one or more of the plurality of domain name patterns to identify the zero-rating rewrite rule of the plurality of zero-rating rewrite rules matching the domain name for the network resource, the zero-rating rewrite rule matching the network resource corresponding to the zero-rating rewrite rule identifying as matching the domain name for the network resource.

4. The method of claim 1, the network resource comprising a web resource, the network request comprising a non-zero-rated uniform resource locator for the web resource, wherein the zero-rated network request comprises a zero-rated uniform resource locator generated based on the non-zero-rated uniform resource locator, the zero-rated uniform resource locator resolving to a zero-rated web server.

5. The method of claim 1, comprising:
receiving a zero-rating check request from the application component to determine whether the network resource can be zero rated, the zero-rating check request received prior to receiving the network request;
comparing the network resource to the plurality of zero-rating rewrite rules to identify the zero-rating rewrite rule matching the network resource; and
informing the application component that the network resource can be zero rated based on identifying the zero-rating rewrite rule.

6. The method of claim 4, further comprising:
receiving the plurality of zero-rating rewrite rules from a zero-rated server, the plurality of zero-rating rewrite rules maintained by a network access component, the zero-rated server preconfigured with the network access component for an initial retrieval of the plurality of zero-rating rewriting rules during initialization of the network access component.

7. The method of claim 1, comprising:
receiving a zero-rating access security token from a zero-rated server; and
performing the zero-rated network request using the zero-rating access security token.

8. An apparatus, comprising:
a processor circuit on a mobile device;
a data store of the mobile device operative to store a plurality of zero-rating rewrite rules; and
a network access component operative on the processor circuit of the mobile device to receive a network request from an application component on the mobile device, the network request for access to a network resource; compare the network resource to the plurality of zero-rating rewrite rules to identify a zero-rating rewrite rule matching the network resource; transform the network request to a zero-rated network request for the network resource using the identified zero-rating rewrite rule; and perform the zero-rated network request.

9. The apparatus of claim 8, the network resource hosted on a network server, wherein comparing the network resource to the plurality of zero-rating rewrite rules comprises matching a domain name for the network resource against a plurality of domain name tags for the plurality of zero-rating rewrite rules to identify the zero-rating rewrite rule associated with a domain name tag of the plurality of domain name tags matching the domain name, wherein transforming the network request to the zero-rated network request for the network resource comprises rewriting the domain name for the network request to a zero-rated domain name corresponding to a zero-rated network server, wherein performing the zero-rated network request comprises requesting the network resource from the zero-rated network server.

10. The apparatus of claim 8, the zero-rated network request comprising a zero-rated domain name replacing a domain name for the network resource from the network request, the network access component further operative to retrieve the plurality of zero-rating rewrite rules from a data store, each of the plurality of zero-rating rewrite rules associated with a domain name pattern of a plurality of a domain name patterns, and compare the domain name for the network resource to one or more of the plurality of domain name patterns to identify the zero-rating rewrite rule of the plurality of zero-rating rewrite rules matching the domain name for the network resource, the zero-rating rewrite rule matching the network resource corresponding to the zero-rating rewrite rule identifying as matching the domain name for the network resource.

11. The apparatus of claim 8, further comprising:
the network access component operative to receive a zero-rating check request from the application component to determine whether the network resource can be zero rated, the zero-rating check request received prior to receiving the network request; compare the network resource to the plurality of zero-rating rewrite rules to identify the zero-rating rewrite rule matching the network resource; and inform the application component that the network resource can be zero rated based on identifying the zero-rating rewrite rule.

12. The apparatus of claim 8, further comprising:
the network access component operative to receive the plurality of zero-rating rewrite rules from a zero-rated server.

13. The apparatus of claim 12, the zero-rated server preconfigured with the network access component for an initial retrieval of the plurality of zero-rating rewriting rules during initialization of the network access component.

14. The apparatus of claim 8, further comprising:
the network access component operative to receive a zero-rating access security token from a zero-rated server; and perform the zero-rated network request using the zero-rating access security token.

15. At least one non-transitory computer-readable storage medium comprising instructions that, when executed, cause a system to:
receive a network request from an application component of a client device, the network request for access to a network resource;
compare, at the client device, the network resource to a plurality of zero-rating rewrite rules to identify a zero-rating rewrite rule matching the network resource;
transform the network request to a zero-rated network request for the network resource using the identified zero-rating rewrite rule; and
perform the zero-rated network request.

16. The computer-readable storage medium of claim 15, the network resource hosted on a network server, wherein comparing the network resource to the plurality of zero-rating rewrite rules comprises matching a domain name for the network resource against a plurality of domain name tags for the plurality of zero-rating rewrite rules to identify the zero-rating rewrite rule associated with a domain name tag of the plurality of domain name tags matching the domain name, wherein transforming the network request to the zero-rated network request for the network resource comprises rewriting the domain name for the network request to a zero-rated domain name corresponding to a zero-rated network server, wherein performing the zero-rated network request comprises requesting the network resource from the zero-rated network server.

17. The computer-readable storage medium of claim 15, the zero-rated network request comprising a zero-rated domain name replacing a domain name for the network resource from the network request, further comprising:
retrieving the plurality of zero-rating rewrite rules from a data store, each of the plurality of zero-rating rewrite rules associated with a domain name pattern of a plurality of a domain name patterns;
comparing the domain name for the network resource to one or more of the plurality of domain name patterns to identify the zero-rating rewrite rule of the plurality of zero-rating rewrite rules matching the domain name for the network resource, the zero-rating rewrite rule matching the network resource corresponding to the zero-rating rewrite rule identifying as matching the domain name for the network resource.

18. The computer-readable storage medium of claim 15, comprising further instructions that, when executed, cause a system to:
receive a zero-rating check request from the application component to determine whether the network resource can be zero rated, the zero-rating check request received prior to receiving the network request;
compare the network resource to the plurality of zero-rating rewrite rules to identify the zero-rating rewrite rule matching the network resource; and
inform the application component that the network resource can be zero rated based on identifying the zero-rating rewrite rule.

19. The computer-readable storage medium of claim 15, comprising further instructions that, when executed, cause a system to:
receive the plurality of zero-rating rewrite rules from a zero-rated server; and
update the plurality of zero-rating rewriting rules using a zero-rated server on a predefined schedule.

20. The computer-readable storage medium of claim 15, comprising further instructions that, when executed, cause a system to:
receive a zero-rating access security token from a zero-rated server; and
perform the zero-rated network request using the zero-rating access security token.

* * * * *